United States Patent [19]

Krueger et al.

[11] Patent Number: 5,044,731
[45] Date of Patent: Sep. 3, 1991

[54] LASER TUBE

[75] Inventors: Hans Krueger, Munich; Wolfgang Welsch, Baldham, both of Fed. Rep. of Germany

[73] Assignee: Siemens Aktiengesellschaft, Munich, Fed. Rep. of Germany

[21] Appl. No.: 475,998

[22] Filed: Feb. 6, 1990

Related U.S. Application Data

[62] Division of Ser. No. 265,932, Nov. 2, 1988, Pat. No. 4,943,972.

[30] Foreign Application Priority Data

Nov. 5, 1987 [DE] Fed. Rep. of Germany ....... 3737626

[51] Int. Cl.$^5$ ............................................. G02B 27/00
[52] U.S. Cl. ..................................... 359/838; 359/900
[58] Field of Search ............... 350/620, 612, 616, 600, 350/320, 641; 331/96, 97, 103; 372/61; 427/34, 35

[56] References Cited

U.S. PATENT DOCUMENTS

| 3,555,450 | 1/1971 | Rockwell, Jr. |
| 3,777,281 | 12/1973 | Hochuli |
| 3,790,900 | 2/1974 | Golser |
| 3,851,275 | 11/1974 | Furuse et al. |
| 3,857,161 | 12/1974 | Hutchins, IV |
| 4,081,762 | 3/1978 | Golser et al. |
| 4,153,317 | 5/1979 | Ljung et al. |
| 4,216,438 | 8/1980 | Seki et al. |
| 4,233,568 | 11/1980 | Hamerdinger et al. |
| 4,250,467 | 2/1981 | Kubota et al. |
| 4,283,688 | 8/1981 | Lloyd et al. |
| 4,564,948 | 1/1986 | Golser |
| 4,575,853 | 3/1987 | Jako |
| 4,649,546 | 3/1987 | Schmid |
| 4,677,640 | 6/1987 | Peterson et al. |
| 4,750,186 | 6/1988 | Steffen |
| 4,847,849 | 7/1989 | Steffen |
| 4,963,012 | 10/1990 | Tracy et al. ......................... 350/320 |

Primary Examiner—Loha Ben
Attorney, Agent, or Firm—Hill, Van Santen, Steadman & Simpson

[57] ABSTRACT

An especially inexpensive laser tube is formed having a mirror mount composed of a material which is not matched to the coefficient of thermal expansion of the mirror material and in that the material is either soft soldered or glued on with a glue that develops little gas.

2 Claims, 3 Drawing Sheets

LASER TUBE

This is a continuation of application Ser. No. 265,932, filed Nov. 2, 1988 now U.S. Pat. No. 4,943,972.

BACKGROUND OF THE INVENTION

1. Field of the Invention

The present invention is related generally to a laser tube having a tubular housing composed of a glass or ceramic material and including at least one metal mirror mount with an integrated mirror.

2. Description of the Related Art

A laser tube is disclosed in U.S. Pat. No. 4,087,762 wherein mirrors are inserted into mirror mounts and are tightly hermetically joined thereto via glass solder. The mirror mounts have coefficients of thermal expansion which are matched to that of the mirrors. This requires that the mirror mounts be formed of a relatively expensive material and that they have a particularly complicated structure, since a transition must be formed from the mirror mount to an end face terminating plate of the laser tube and the terminating plate has a coefficient of thermal expansion matched to that of the laser housing. In other words, the terminating plate of the laser is composed of a different material having a different coefficient of thermal expansion than that of the mirror mount.

SUMMARY OF THE INVENTION

An object of the present invention is to reduce the cost of a mirror mount on a laser tube without accepting a deterioration in the laser power output from the laser. In a laser tube, such as for use in a gas laser, having a housing tube composed of a glass or ceramic material with at least one metal mirror mount and an integrated mirror, the above object is achieved by forming the metal mirror mount of a cost beneficial, or inexpensive, material that is not matched to the coefficient of thermal expansion of the mirror and by providing the mirror material with at least one solderable region and soldering the mirror onto the mirror mount with a soft solder. Alternately, the metallic mirror mount of inexpensive material not matched to the coefficient of thermal expansion of the mirror material is fastened to the mirror by a glue that develops and emits only little gas.

The reference to an inexpensive or cost beneficial material herein are to a material which is inexpensive relative to considerably more costly materials that have a coefficient of thermal expansion matched to, for example, the mirror material mounted thereon, and that are known for use as mirror mounts in laser tubes.

Both embodiments yield adequately vacuum tight and, thereby, elastically deformable connections between the mirrors and the mirror mounts that resist the temperature stresses which can arise in the laser. The highest temperature stressing of the corresponding parts occurs when the laser is being soldered together, as experience has shown. The two, recited embodiments provide low joining temperatures which are, therefore, advantageous by avoiding the ordinarily high soldering temperature stresses which lie considerably above the stresses occurring in the operating mode of the laser. In the embodiment utilizing a glue to hold the mirror to the mirror mount, a high-grade, silver-filled epoxy resin is especially well suited for gluing the mirror.

A further improvement of the invention provides an especially compact structure when the laser tube is terminated with an end disk of metal having a coefficient of thermal expansion adapted, or substantially matched, to that of the housing tube. A fully reflecting mirror of the resonator mirror pair is soldered or glued to the end disk in the inside of the laser tube.

An additional possibility for simplifying the manufacture of a laser tube is provided when at least one of the laser mirrors is cut from a larger mother mirror. By making a mother mirror and then dividing it into a plurality of individual laser mirrors, considerable time and expense is saved. The individual laser mirrors advantageously comprise quadrilateral surfaces and the quadrilateral surfaces are preferably quadratic. However, the surfaces of the mirrors can also have other quadrilateral shapes such as, for example, a rectangular shape, or a trapezoidal shape.

The laser mirrors of the present laser tube are advantageously manufactured in a method having the following method steps as shown in FIG. 4:

(a) a mother mirror having an area equal to the area of a plurality of individual mirrors is coated with a photoresist;

(b) the photoresist is hardened on the mother mirror;

(c) the mother mirror is sawn into individual mirrors, whereby the cut edges thereof are simultaneously provided with a chamfer;

(d) the individual laser mirrors are cleaned; and (e) the photoresist is removed from the individual laser mirrors in a plasma incinerating system without leaving a residue thereon.

A plasma incinerating system consists of a chamber with a high-frequency coil with which high-frequency ion plasma is generated in an oxygen atmosphere. The ion plasma burns off the photoresist without leaving a residue on the mirrors.

An alternate method, shown in FIG. 5, is likewise advantageously utilized wherein the mother mirror is not sawn into individual mirrors but instead is scored and broken and, thereafter, the edges of the individual mirrors are rounded using a hydrofluoric acid. The remaining method steps of this alternate method are the same as that cited above.

An advantageous method for adjusting the mirrors of a laser tube is provided by the present invention wherein two integrated mirrors are provided for the laser tube to form the laser resonator. After assembly of the laser tube, a test beam having a wavelength which is only partially reflected by the mirrors is beamed into the laser tube and the two mirrors are adjusted after the reflections of the test beam at the mirror surfaces. For example, the emission of a green helium-neon laser is advantageously utilized for the adjustment of a red helium-neon laser. This method is particularly well suited for mirror adjustment in those instances where one of the mirrors has been glued to a metal plate, since the test beam in these instances can be beamed into the laser tube from only one side (the partially reflecting side) and since a test beam which is fully reflected by the mirrors would hardly noticeably pass through the first mirror so that the adjustment of the second mirror (glued to the metal plate) which is not visible from the outside would no longer be practically possible.

DESCRIPTION OF THE PREFERRED EMBODIMENTS

Figure 1:
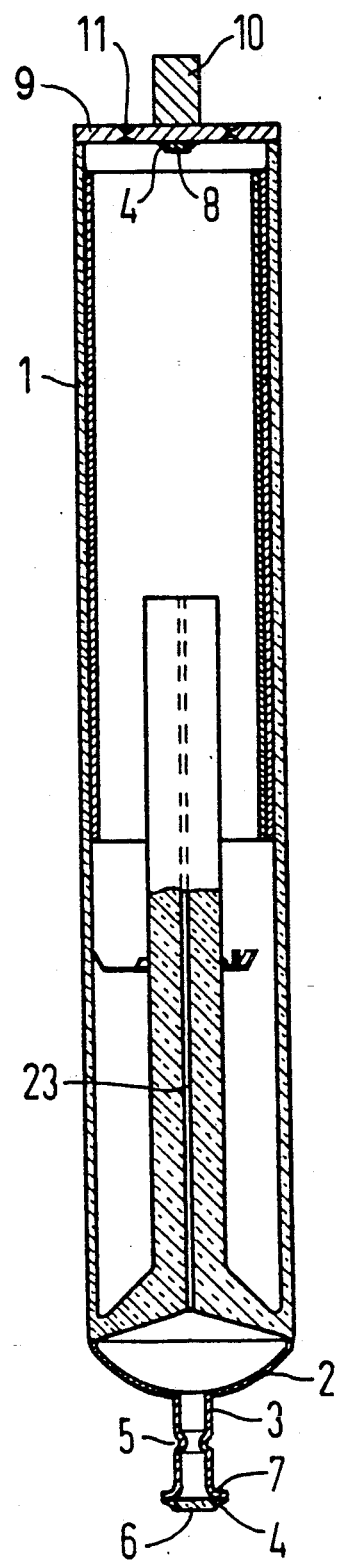
FIG. 1 is a longitudinal cross section of an embodiment of a laser tube according to the principles of the present invention.

In FIG. 1, a housing tube 1 is formed of a glass or ceramic material and is terminated at one end with a metal cap 2. The metal cap 2 has substantially the same coefficient of thermal expansion as that of the glass or ceramic laser tube 1 to prevent thermal stress therebetween.

A tube 3 is composed of a relatively inexpensive material that is inserted into the metal cap 2 in the direction of the laser emission. The tube 3 may be of, for example, copper or steel as suitable, inexpensive materials. The tube 3 has a widened, flange-like end 7 facing directed away from the metal cap 2 and serving as a mirror mount for a mirror 6. The mirror 6 is joined to the tube 3 in vacuum-tight fashion using either a glue or a solder as indicated at 4. Preferably, when a glue is used, the glue is of a type which exhibits little gas emission and, in one embodiment, is of a high-grade silver-filled epoxy resin. Such glue also has a high thermal conductivity and provides good heat transmission from the mirror 6 to the flange 7 of the tube 3.

A bead, or restricted portion, 5 of the tube 3 is provided between the cap 2 and the flange 7 so that the angle of inclination of the mirror 6 can be adjusted relative to the laser tube 2 by deforming the tube 3 at the bead 5.

A face plate 9 is mounted at an opposite end of the housing tube 1. The face plate 9 serves as a mirror mount in that a mirror 8 is glued thereonto with a glue 4 or by a soft solder. The face plate 9 is composed of a material having a coefficient of thermal expansion substantially matched to that of the housing tube 1. The glue 4 exhibits adequate elasticity so that the mirror 8 does not detach or deform even given the anticipated temperature fluctuations in the laser parts. This is further promoted by supporting the mirror 8 on a metal plate, where the mirror 8 is, first, kept extremely thin so that it is not exposed to the vacuum pressure, and second, preferably has an extremely small area which needs only correspond to the beam diameter. The glue 4 exhibits good thermal conductivity so that improved heat elimination from the mirror 8 to the face plate 9 is provided. Furthermore, the thinner and smaller the mirror 8, the less pronounced the warping of the mirror as a result of temperature fluctuations.

The joint between the face plate 9 and the housing tube 1 can also be formed by a glue of the above-described type; however, it can also be executed with a soft solder technique. In both instances, the temperature stress for the glue 4 at the mirror 8 is kept adequately slight.

The mirror 8 may be applied lying precisely parallel to the face plate 9 so that it is generally adequate to align the face plate 9 exactly perpendicular to a discharge channel 23 in a capillary tube of the laser. To provide a means for additional, subsequent correction of the mirror position, an adjustment pin 10 is attached to the face plate 9 which permits slight bending of the face plate 9. As needed, the adjustement pin 10 is surrounded by an annular zone 11 having a relatively thin wall thickness for better bending of the face plate 9.

Figure 2:
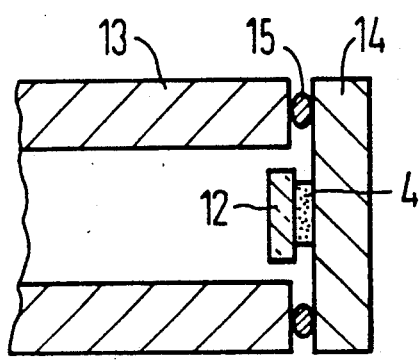
FIG. 2 is an enlarged fragmentary cross section of another embodiment showing fastening of a laser mirror to the laser tube according to the invention.

In FIG. 2 is shown schematically the fastening of a mirror 12 with a glue 4 to a metal plate 14, whereby the metal plate 14 is soldered to a metal tube 13 with a ring of solder 15. This embodiment enables especially small mirrors to be used in combination with a mirror mount of a standard type. It likewise has the advantage that the metal tube 13 and the metal plate 14 can be manufactured of an inexpensive material. The glued location of the mirror 12 is especially small in area so that any deformations, such as thermal deformations, in this area are kept specially slight.

Figure 3:
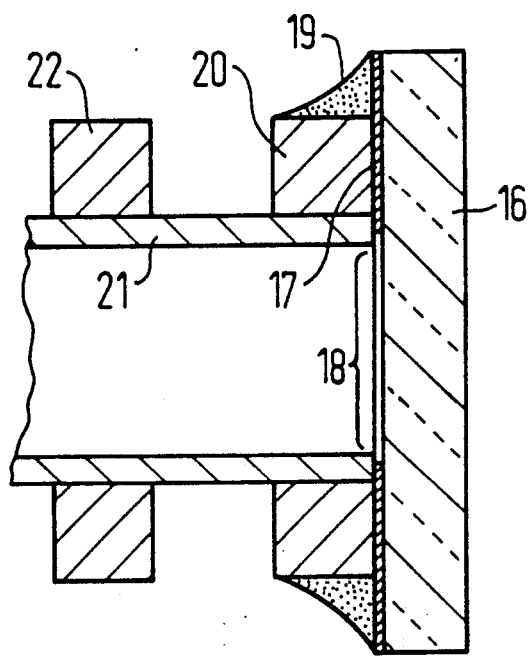
FIG. 3 is an enlarged fragmentary cross section of a further embodiment of the invention showing an alternate means of fastening the laser mirror to the laser tube.
Figure 4:
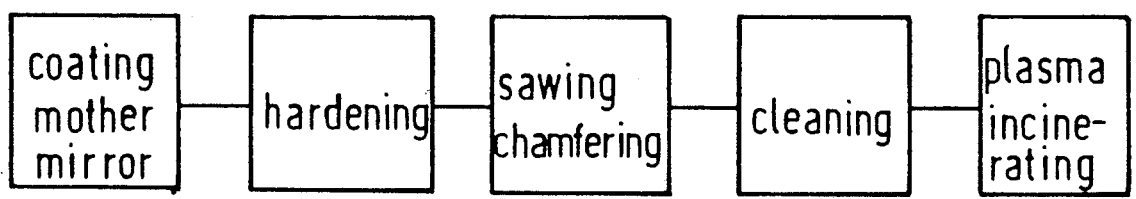
FIG. 4 is a block flow diagram showing one embodiment of a method for manufacturing mirrors according to the present invention.
Figure 5:
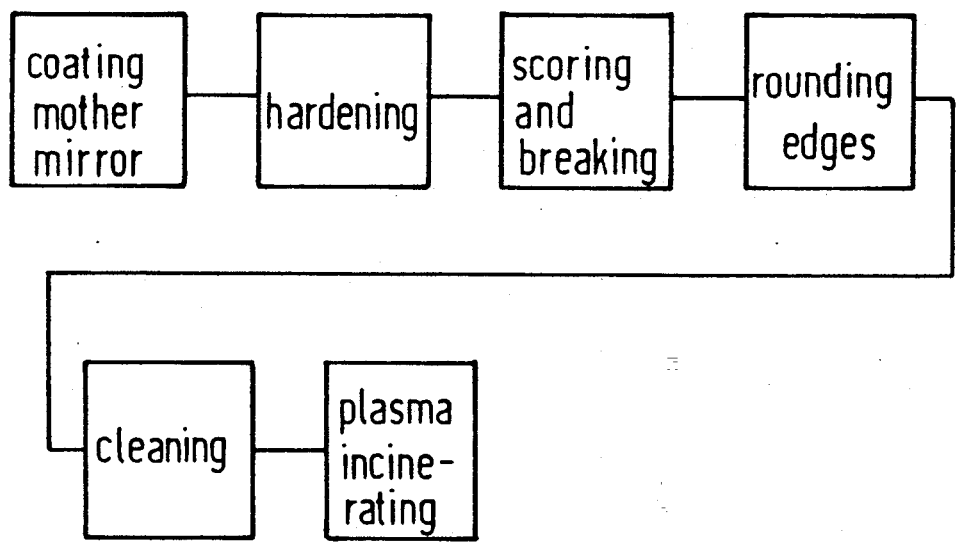
FIG. 5 is a block flow diagram of a second embodiment for manufacturing mirrors.

Referring to FIG. 3, an embodiment is shown wherein a mirror 16 is coated with a solderable metal layer 17, the metal layer 17 leaving free a beam passage region 18. The metal layer 17 is soldered to a ring 20 of metal via solder 19. The ring 20 is firmly seated on a relatively thin metal tube 21. A further ring 22 is secured to the metal tube 21 at a slight distance from the first metal ring 20. The rings 20 and 22 are advantageously soldered onto the metal tube 21; in many instances, however, it is adequate to simply press the rings 20 and 22 onto the metal tube 21. The rings 20 and 22 and the metal tube 21 are advantageously composed of copper. Copper is a material which can be easily soldered and is ductable so that bending of the tube 21 in the region between the two rings 20 and 22 is easily possible to provide adjusting of the mirror 16. The embodiment of FIG. 3 allows especially small dimensions for the mirror mount. In an alternate embodiment of the invention, the ring 20 may be joined to the tube 21 in one piece, such as by flaring the end thereof. In this case, it is recommendable to manufacture this combined part with an extrusion process.

Thus, an especially inexpensive laser tube is formed which includes a mirror mount composed of a material not matched to the coefficient of thermal expansion of the mirror material and in which the mirror is either soft soldered on or glued on with a glue that develops little gas. The invention is especially utilized for inexpensive gas laser tubes.

Although other modifications and changes may be suggested by those skilled in the art, it is the intention of the inventors to embody within the patent warranted hereon all changes and modifications as reasonably and properly come within the scope of their contribution to the art.

We claim:

1. A method for manufacturing mirrors, comprising the steps of:
   coating a mother mirror having an area equal to that of a plurality of individual mirrors with a photoresist;
   hardening said photoresist;
   sawing said mother mirror into said plurality of individual mirrors, including providing cut edges of said individual mirrors with a chamfer;
   cleaning said individual mirrors; and
   removing said photoresist free of residue in a plasma incinerating system.

2. A method for manufacturing laser mirrors, comprising the steps of:

coating a mother mirror having an area equal to that of a plurality of individual mirrors with a photoresist;

hardening said photoresist;

sectioning said mother mirror into said plurality of individual mirrors by scoring and breaking;

rounding edges of said individual mirrors with hydrofluoric acid;

cleaning said individual mirrors; and removing said photoresist free of residue in a plasma incinerating system.

* * * * *